US012589736B2

(12) United States Patent
Rajan Kesavelu Shekar et al.

(10) Patent No.: US 12,589,736 B2
(45) Date of Patent: Mar. 31, 2026

(54) COLLISION PREVENTION SYSTEM AND METHOD FOR A VEHICLE

(71) Applicant: NXP USA, INC., Austin, TX (US)

(72) Inventors: Pramod Rajan Kesavelu Shekar, Bangalore (IN); Anand Shirwal, Bangalore (IN)

(73) Assignee: NXP USA, Inc., Austin, TX (US)

( * ) Notice: Subject to any disclaimer, the term of this patent is extended or adjusted under 35 U.S.C. 154(b) by 290 days.

(21) Appl. No.: 18/308,831

(22) Filed: Apr. 28, 2023

(65) Prior Publication Data

US 2023/0373473 A1 Nov. 23, 2023

(30) Foreign Application Priority Data

May 17, 2022 (IN) .............................. 202211028334
Jul. 15, 2022 (EP) .................................... 22185309

(51) Int. Cl.
*B60W 30/09* (2012.01)
*B60W 40/02* (2006.01)
*B60W 50/10* (2012.01)
*B60W 50/14* (2020.01)

(52) U.S. Cl.
CPC ............ *B60W 30/09* (2013.01); *B60W 40/02* (2013.01); *B60W 50/10* (2013.01); *B60W 50/14* (2013.01); *B60W 2420/403* (2013.01); *B60W 2420/408* (2024.01); *B60W 2554/80* (2020.02)

(58) Field of Classification Search
CPC ................. B60W 30/09; B60W 50/14; B60W 2420/403; B60W 2420/408
See application file for complete search history.

(56) References Cited

U.S. PATENT DOCUMENTS 9,269,263 B2 *   2/2016   Gieseke ................... G08G 1/04
9,488,482 B2 *  11/2016   Chan ...................... G08G 1/165
10,671,862 B2    6/2020   Meganathan et al.
(Continued)

FOREIGN PATENT DOCUMENTS

CN          107237575 A        10/2017

OTHER PUBLICATIONS

Cision PR Newswire, "Advanced Driver-Assistance Systems (ADAS) Market to Reach US$ 72.9 Billion by 2026, Globally |CAGR: 15.9%|UnivDatos Market Insights", Dec. 4, 2020.
(Continued)

*Primary Examiner* — Scott A Browne
*Assistant Examiner* — Josephine Elizabeth Rich

(57) ABSTRACT

A collision prevention system for a vehicle. A collision prevention method for a vehicle. The system includes a first sensor operable to monitor a dimension (e.g. height) of the vehicle. The system also includes a second sensor for detecting a dimension (e.g. height) of an approaching obstacle. The system further includes a controller couplable to the first sensor and the second sensor. The controller is operable to compare the dimension of the vehicle monitored by the first sensor with the dimension of the approaching obstacle detected by the second sensor. The controller is also operable to, in response to a determination that the comparison of the dimension of the vehicle with the dimension of the approaching obstacle indicates a collision between the vehicle and the obstacle is possible, perform a collision prevention action.

17 Claims, 5 Drawing Sheets

(56) References Cited

U.S. PATENT DOCUMENTS

| | | | | |
|---|---|---|---|---|
| 2005/0242608 A1* | 11/2005 | Vance | .................... | B60R 13/02 |
| | | | | 296/39.1 |
| 2010/0302022 A1* | 12/2010 | Saban | .................... | B60N 2/268 |
| | | | | 340/459 |
| 2013/0222592 A1 | 8/2013 | Gieseke | | |
| 2016/0297360 A1 | 10/2016 | Smyth et al. | | |
| 2021/0129750 A1 | 5/2021 | Nugent et al. | | |

OTHER PUBLICATIONS

Globenewswire, "Automotive Radar Market to Hit USD 3131.5 Million at 6.5% CAGR by 2027; Stoked by Stringent Government Regulations to Reduce Road Fatalities: Fortune Business Insights™", Fortune Business Insights, Mar. 9, 2021.

Globenewswire, "Automotive RADAR Market Size will Hit US$ 8.30 Bn by 2027", Presedence Research, Oct. 27, 2020.

Globenewswire, Global Advanced Driver Assistance Systems (ADAS) Market to Grow at a CAGR of 17% During 2020-2025 | Expert Market Research, Oct. 27, 2020.

Grand View Research, "Automotive Radar Market Worth $12.16 Billion by 2025 | CAGR: 20.8%", Aug. 2017.

Hindustan Times, "Wrong placing of height barrier blamed for Dubai bus crash that killed 12 Indians", Press Trust of India, Jul. 10, 2019.

Randler, M., "360-Degree View in 4D", ZFexperts, file:///C:/Users/nxa08344/Desktop/360-Degree%20View%20in%204D%20-%20ZF.html, downloaded Apr. 6, 2023.

Teller Report, "A 13-year-old child climbing over the sunroof . . . He hits the sign", Oct. 30, 2018.

Wang, H., "Real-Time Vehicle Detection Algorithm Based on Vision and Lidar Point Cloud Fusion", Hindawi Journal of Sensors, vol. 2019, Article ID 8473980, 9 pages, https://doi.org/10.1155/2019/8473980, Apr. 17, 2019.

* cited by examiner

COLLISION PREVENTION SYSTEM AND METHOD FOR A VEHICLE

CROSS-REFERENCE TO RELATED APPLICATIONS

This application claims the priority under 35 U.S.C. § 119 of India application Ser. No. 20/221,1028334, filed on 17 May 2022; and EP application Ser. No. 22/185,309.6, filed on Jul. 15, 2022, the contents of which are incorporated by reference herein.

BACKGROUND

The present specification relates to a system and method for a vehicle.

Height restrictions on roads are in place to prevent vehicles having a certain height from colliding with overhead obstructions such as a low bridge or gantry. Generally, the height of a vehicle may be static and known. In this case, a driver of the vehicle may simply avoid taking routes which involve height limits with which the vehicle does not comply.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a collision prevention system for a vehicle, the system comprising:

a first sensor operable to monitor a dimension of the vehicle;

a second sensor for detecting a dimension of an approaching obstacle; and a controller couplable to the first sensor and the second sensor;

wherein the controller is operable to:

compare the dimension of the vehicle monitored by the first sensor with the dimension of the approaching obstacle detected by the second sensor; and in response to a determination that the comparison of the dimension of the vehicle with the dimension of the approaching obstacle indicates a collision between the vehicle and the obstacle is possible, performing a collision prevention action.

According to another aspect of the present disclosure, there is provided a collision prevention method for a vehicle, the method comprising:

monitoring a dimension of the vehicle;

detecting a dimension of an approaching obstacle; and comparing the dimension of the vehicle with the dimension of the approaching obstacle; and in response to a determination that the comparison of the dimension of the vehicle with the dimension of the approaching obstacle indicates a collision between the vehicle and the obstacle is possible, performing a collision prevention action.

A collision avoidance system or method according to the present disclosure may allow collisions associated with the dimension of the vehicle to be avoided.

The comparison of the dimension of the vehicle with the dimension of the approaching obstacle may, for instance, be based upon real-time changes in the dimension of the vehicle.

The determination may include determining whether the dimension of the vehicle monitored by the first sensor exceeds a safe dimension threshold compared to the dimension of the approaching obstacle. The safe dimension threshold may be expressed as a percentage of the obstacle dimension (e.g. the safe dimension threshold may be 80%, 85%, 90%, or 95% etc. of the approaching obstacle dimension), or may be associated with an absolute difference between the dimension of the vehicle and the dimension of the approaching obstacle (e.g. the threshold may be 100 cm, 50 cm, 30 cm etc. less than the approaching obstacle dimension). It is envisaged that the safe dimension threshold could be programmable, e.g. according to the type of vehicle.

The first sensor may be operable to monitor the dimension of the vehicle by periodically sensing the dimension of the vehicle at regular time intervals (e.g. the time interval may be 0.1 seconds, 0.5 seconds, 1 second, or in the range 2-10 seconds etc.).

The dimension of the vehicle may be a total dimension including a dimension of a load mounted on the vehicle and/or of a passenger protruding from (e.g. a window or sunroof) the vehicle.

The collision prevention action may include applying a brake of the vehicle.

The collision prevention action may include generating an collision alert for a driver of the vehicle. The alert may, for instance, be an audible and/or visual alert.

The dimension of the vehicle (e.g. monitored by the first sensor) may be a height of the vehicle. The dimension of the approaching obstacle (e.g. detected by the second sensor) may be a height of the approaching obstacle. Accordingly, the safe dimension threshold may also be a safe height threshold.

The collision prevention action may include a pre-emptive collision prevention action to prevent a dimension of the vehicle increasing beyond a safe dimension threshold associated with the dimension of the approaching obstacle as the vehicle approaches the obstacle. This may allow real time changes in the dimension of the vehicle which may cause a collision to be prevented.

The pre-emptive collision prevention action may include denying a driver or passenger request to open the window or sunroof of the vehicle.

The first sensor and/or the second sensor each comprise:

a camera;

an ultrasound sensor;

a RADAR sensor; and/or a LIDAR sensor.

According to a further aspect of the present disclosure, there is provided a vehicle comprising the collision prevention system set out above.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

As described herein, the dimension of a vehicle is monitored by a sensor and compared with a dimension of an approaching obstacle detected by another sensor. In the following embodiments, the dimension of the vehicle monitored by the first sensor is a height of the vehicle and the dimension of the approaching obstacle detected by the second sensor is a height of the approaching obstacle. However, it will be appreciated that embodiments of this disclosure may also be applied to other dimensions of the vehicle and the approaching obstacle. For instance, the dimension of the vehicle monitored by the first sensor may be a lateral dimension of the vehicle (e.g. in a direction substantially parallel to the ground and substantially perpendicular to a direction of travel of the vehicle). Similarly, the dimension of the approaching obstacle detected by the second sensor may be a lateral dimension associated with the lateral dimension of the vehicle monitored by the first sensor.

Figure 1:
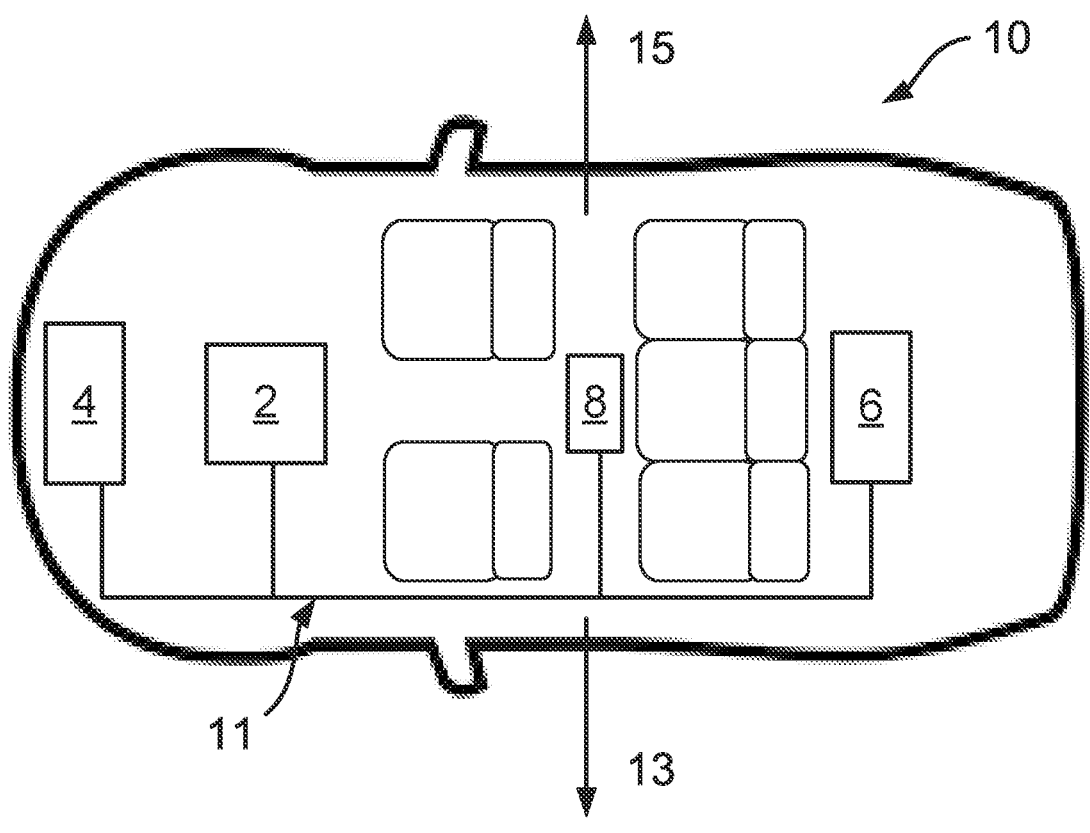
FIG. 1 shows a vehicle according to an embodiment of this disclosure.

FIG. 1 shows a vehicle 10 according to an embodiment of this disclosure. The vehicle may, for instance be a car, truck, lorry or any other kind of road vehicle.

The vehicle 10 includes a first sensor 6. The first sensor 6 is operable to monitor a height of the vehicle 10. As noted above, the dimension monitored by the first sensor may not be the height of the vehicle but may instead be a lateral dimension of the vehicle (e.g. see the lateral dimensions 13, 15 shown in FIG. 1).

The first sensor 6 may be located in any suitable position within or upon the vehicle 10. For example the first sensor 6 may be located on a roof, side, or other exterior part of the vehicle 10. The first sensor 6 may comprise any suitable sensor for monitoring the dimension (height, lateral dimension etc.) of the vehicle 10, for example, the first sensor 6 may comprise a camera, an ultrasound sensor, a RADAR (Radio Detection and Ranging) sensor, or a LIDAR (Light Detection and Ranging) sensor.

The vehicle 10 also includes a second sensor 4. The second sensor is operable to detect an approaching obstacle. In particular, the second sensor 4 is operable to detect a dimension (e.g. height, lateral dimension such as width) of the approaching obstacle. The dimension (height, in this example) of the approaching obstacle may represent a clearance dimension (height, in this example), above which collisions may, or will, occur.

The approaching obstacle may, for example, be an overhanging obstacle such as a low bridge or gantry, a tunnel, a road sign or a tree branch.

The second sensor 4 may, for example, be located toward the front of the vehicle 10. The second sensor 4 may be any suitable sensor for determining the dimension (height, in this example) of the approaching obstacle. For instance, the second sensor may comprise a RADAR sensor a LIDAR sensor, an ultrasound sensor or a camera.

The vehicle 10 also includes a controller 2. The controller 2 may be coupled to the first sensor 6 and the second sensor 4 by, for example, a data/control signal bus 11. The bus may be part of a Car Area Network (CAN). The bus may comprise a wired and/or a wireless connection. As will be described in more detail below, the controller 2 is operable to receive signals from the first sensor 6 and the second sensor 4, those signals indicating the dimension (height, in this example) of the vehicle 10 monitored by the first sensor 6 and the dimension (height, in this example) of the approaching obstacle detected by the second sensor 4.

The controller 2 is operable to compare the dimension (height, in this example) of the vehicle 10 monitored by the first sensor 6 with the dimension (height, in this example) of the approaching obstacle detected by the second sensor 4 and, in response to that comparison, to determine whether a collision between the vehicle and the obstacle is possible. If it is determined that a collision is possible, the controller 2 is further operable to perform a collision prevention action. Types of collision prevention action may, for example, include:

applying the brakes of the vehicle to slow the vehicle down (for example, to a stop), producing an audible or visual collision alert to alert the driver of the vehicle of the impending collision; and/or a pre-emptive collision prevention action (such as disabling a sunroof or window opening mechanism of the vehicle to prevent a passenger of the vehicle protruding from the window or sunroof until the vehicle has cleared or passed beneath the approaching obstacle).

The vehicle 10 shown in FIG. 1 further includes one or more control units 8. These control units 8 may be, for example, for controlling a sunroof or window of the vehicle as noted above. The one or more control units 8 may also be coupled to the controller 2 via the bus 11.

Figure 2:
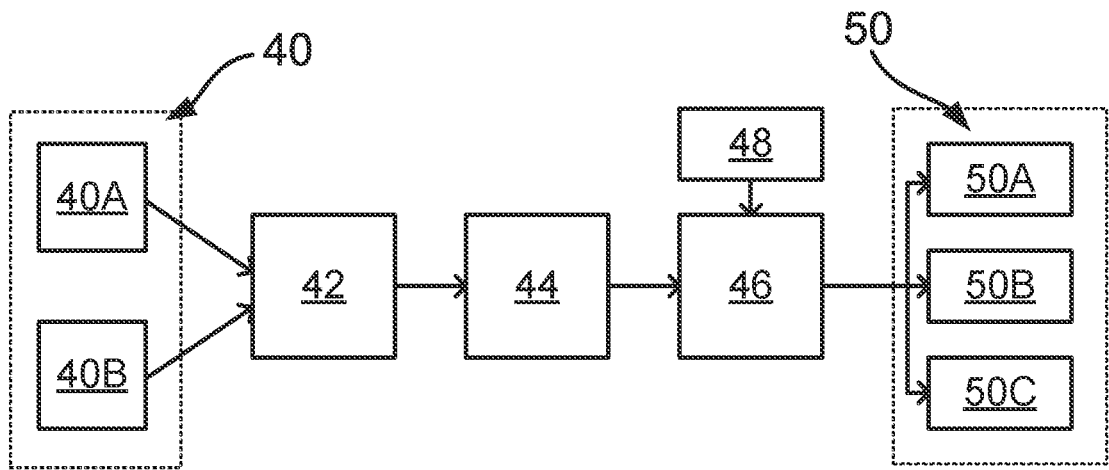
FIG. 2 shows a system according to another embodiment of this disclosure.

FIG. 2 shows a schematic of the functional blocks of a collision prevention system for a vehicle of the kind shown in FIG. 1, according to an embodiment of this disclosure. FIG. 2 shows that the system can include a plurality of sensors 4. For instance, in FIG. 2, the sensor 40A may represent the first sensor 6 and the sensor 40B may represent the second sensor 4. It is envisaged that further sensors may be provided in the plurality of sensors 40, other than the first sensor 6 and the second sensor 4.

In this embodiment, the controller 2 includes functional blocks 42, 44 and 46. The functional block 42 may act to receive the signals from the plurality of sensors 40 such as the signals relating to the monitored dimension (height, in this example) of the vehicle 10 and the detected dimension (height, in this example) of the approaching obstacle as noted above in respect of FIG. 1. The signals received by the functional block 42 may then be passed to a data processing block 44, in which the aforementioned comparison of the dimension (height, in this example) of the vehicle 10 monitored by the first sensor 6 with the dimension (height, in this example) of the approaching obstacle detected by the second sensor 4 may be performed. The result of this comparison may then be passed to a central processing unit 46. The central processing unit 46 may then take action in response to the comparison performed by the functional block 44. In particular, the central processing unit 46 may act to implement a collision prevention action as described herein.

The embodiment shown in FIG. 2 also includes a number of electronic components 50 of the vehicle 10. Examples of such electronic components may include a sunroof or window control unit 50A of the vehicle 10, a brake control unit 50B of the vehicle 10 and/or an alert unit 50C of the vehicle 10, for producing an audible or visual alert for the driver of the vehicle 10. The central processing unit 46 may be coupled to the vehicle electronic components 50 (e.g., using the bus 11 shown in FIG. 1) and may be operable to send appropriate signals to the electronic components 50 for implementing one or more collision prevention actions in the event that the comparison result received from the functional block 44 indicates that a collision between the vehicle 10 and the approaching obstacle is possible.

In FIG. 2, block 48 represents a user request. The user request 48 may, for example, be a request to open a window or sunroof of the vehicle 10. The incorporation of the user request 48 into a method according to an embodiment of this disclosure will be described in more detail below in relation to, for example, FIGS. 5 to 7.

Figure 3:
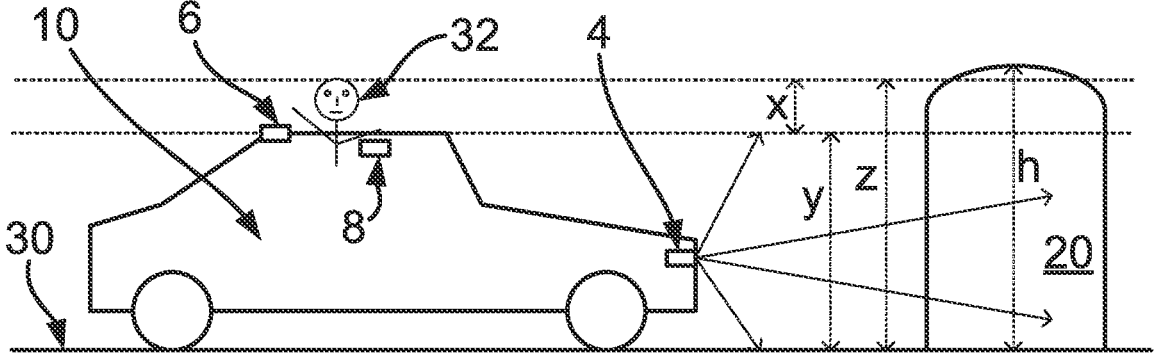
FIG. 3 shows a vehicle encountering an obstacle, according to a further embodiment of this disclosure.

FIG. 3 shows a vehicle 10 approaching an obstacle 20 in accordance with an embodiment of this disclosure. The approaching obstacle 20 has a height h. The height h corresponds to a clearance height from the ground 30. Accordingly, for example, the height h may be the height of an underside of a tree branch, or the height of the underside of low bridge or gantry or road sign from the ground 30.

FIG. 3 again shows the first sensor 6 and the second sensor 4 of the vehicle 10 as well as the sunroof or window control unit 8.

In this embodiment, the vehicle 10 has a static height component y and a non-static height component x. The total height of the vehicle 10 may be denoted as z where z=y+x.

According to an embodiment, in operation, the first sensor 6 may be operable to determine the height z.

This may, for instance, be achieved by knowledge of the static height component y, to which the first sensor 6 may add the value of x based over upon actual observations of dynamic changes (represented by x) in the total height z of the vehicle 10 or by possible changes that may occur in x as the vehicle 10 approaches the obstacle 20. By way of example, if a passenger 32 of the vehicle 10 were to place their head of other parts of their body through the sunroof or window of the vehicle 10, the total height of the vehicle z may change. It will be appreciated that similar considerations may apply to a lateral dimension of the vehicle, should the passenger put their head through an open side window of the vehicle. In this example, the first sensor 6 may detect the new total height z of the vehicle according to the height of the passengers head 32 above the ground 30 and accordingly may evaluate a new value of the total height z of the vehicle 10 and communicate this actual value to the controller 2.

In another example, the system may anticipate the possible new total height z (or lateral dimension) of the vehicle 10 in the event that the passenger 32 were to extend their head through the sunroof or window of the vehicle 10, albeit that at that moment the passenger 32 has not (yet) placed their head through the sunroof or window (e.g. the sunroof or window of the vehicle 10 is currently closed). This may be achieved either by the first sensor 6 reporting a value of z that includes the static height y plus an anticipated possible change (x) in the total height z in the event that the passenger 32 actually goes ahead and places their head through the sunroof or window. Alternatively, the first sensor 6 may simply report the actual present value of z, and anticipated changes (x) in the total height (for example, if the passenger 32 actually goes ahead and places their head through the sunroof or window) may be factored in at the controller 2, as part of the determination of whether a collision is possible.

In either event, the first sensor 6 is operable to communicate the total height z of the vehicle to the controller 2 so that the comparison of the total height z with the height h of the approaching obstacle 20 may be performed.

In order to allow sufficient time for the collision prevention action to be performed, the second sensor 4 may need to determine the value of h of the approaching obstacle 20 at a given distance. It would be appreciated that this distance may vary according to the speed of the vehicle 10. A typical value for the distance from the approaching obstacle 20 at which the height h needs to be determined would be around 50-150 meters although, again, it will be appreciated that this distance may vary according to the specific situation.

Figure 4:
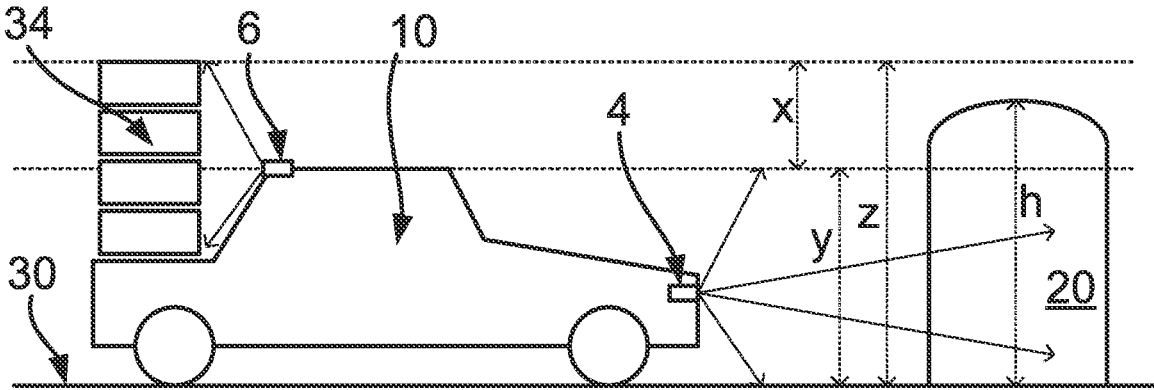
FIG. 4 shows a vehicle encountering an obstacle, according to another embodiment of this disclosure.

FIG. 4 shows a vehicle 10 encountering an approaching obstacle 20 in accordance with another embodiment of this disclosure. The embodiment shown in FIG. 4 is similar to the embodiment shown in FIG. 3, except that in this embodiment, the deviation of the total height z of the vehicle 10 from the nominal static height y of the vehicle 10 results from the mounting of a load 34 (for instance, luggage or other objects) upon the vehicle 10, where the load 34 extends beyond the roof of the vehicle 10. In this sense, the load 34 may have a static component x which extends above the nominal height y. Nevertheless, it will be appreciated that the additional height of the load 34 beyond the nominal static height y of the vehicle 10 represents an additional increase in the total height of the vehicle z. It may also be appreciated that the height of the load 34 may change in real time if the load 34 is not securely mounted upon the vehicle 10. Again, the first sensor 6 is operable to observe the height difference x produced by the load 34 and communicate the value of the total height z of the vehicle 10 to the controller 2, typically in real time. Anticipated changes may also be factored in, as noted above. The value of the total height z of the vehicle 10 may again be communicated to the controller 2 so that the comparison of the total height z of the vehicle 10 with the height h of the approaching obstacle 20 may be performed.

According to embodiments of this disclosure, the total height z of the vehicle 10, actual or anticipated, may thus be monitored in real time and any changes in the total height z of the vehicle 10 may be communicated to the controller 2. In some embodiments, the first sensor 6 is operable to monitor the total height of the vehicle 10 by periodically sensing the height of the vehicle 10 at regular time intervals. By way of example only, the time intervals may be 0.1 seconds, 0.5 seconds, 1 second or any other suitable time interval. When shorter time intervals are used, this may allow the collision prevention system of this disclosure to react more quickly to real time changes in the total height z of the vehicle 10, although this may come at the cost of increased processing overhead.

Although FIGS. 3 and 4 have been explained in relation to height, it will be appreciated that the same principles may be applied to other dimensions such as a lateral dimension of the vehicle and a lateral dimension of the approaching obstacle.

Figure 5:
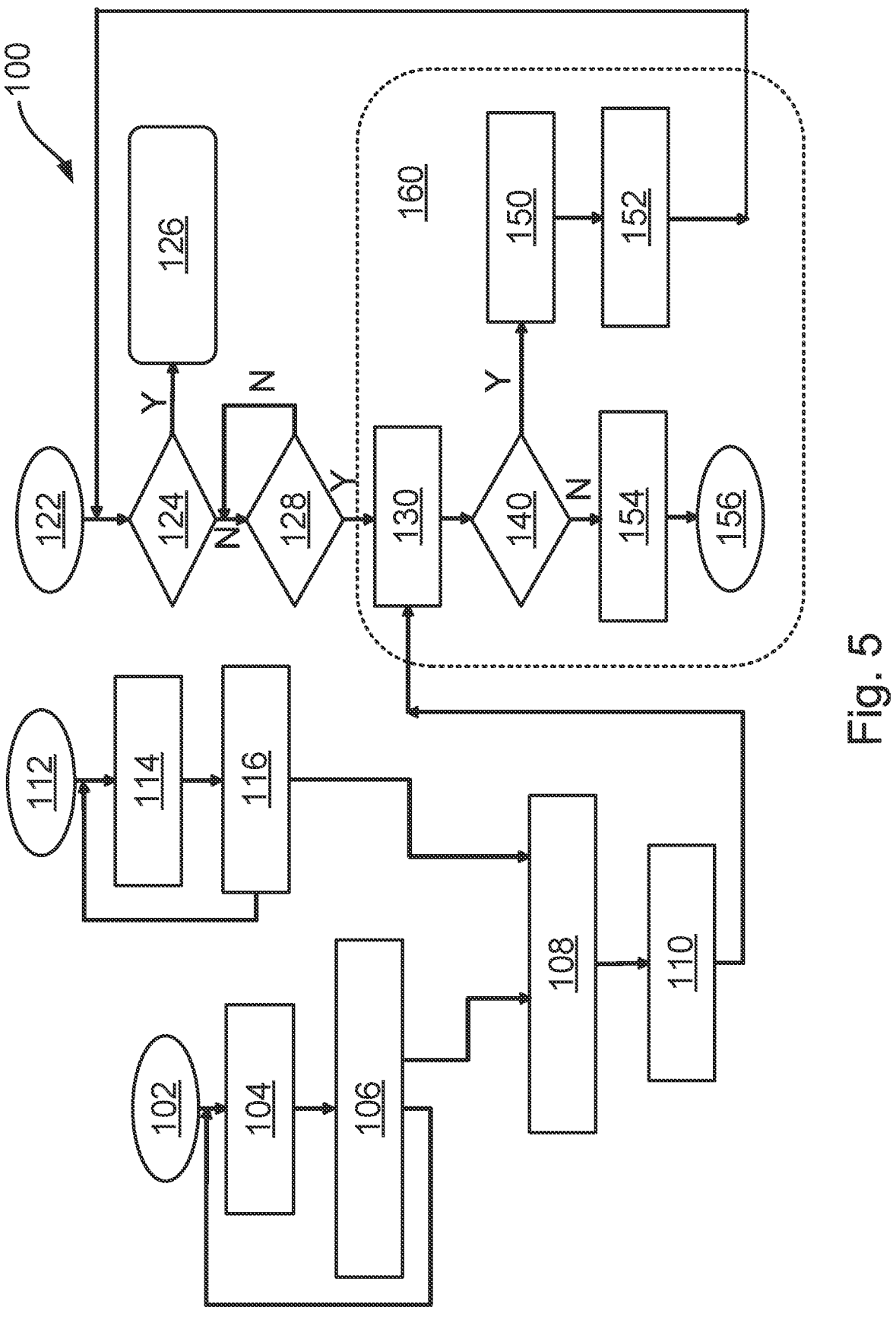
FIG. 5 shows a method according to a further embodiment of this disclosure.

FIG. 5 shows a collision prevention method 100 according to an embodiment of this disclosure. The method 100 in this embodiment includes a number of different branches, starting at steps 102, 112, 122. Note that these branches may be performed in parallel.

A first branch of the method 100 starts at step 102. The first branch corresponds to the operation of the second sensor 4 of the vehicle 10. In step 104, data from the second sensor 4 may be processed and then in step 106, the height h of an approaching obstacle may be determined from the data processed in step 104. As the height h of the approaching object is determined at step 106, this first branch of the method 100 may continually return to step 104 to process more data from the second sensor 4. In this way, any changes in the height h may be detected, and the heights of newly approaching objects may also be detected and determined.

A second branch of the method 100 starts at step 112. The second branch corresponds to the operation of the first sensor 6 of the vehicle 10. At step 114, data from the first sensor 6 may processed. At step 116, the total height of the vehicle 10 may be determined using the data processed in step 114. As already described above, the total height may or may not, at this stage, factor in an anticipated possible change in the height of the vehicle 10. As the total height of the vehicle 10 is determined at step 116, this second branch of the method 100 may continually return to step 114 to process more data from the first sensor 6. In this way, any real time changes in the total height of the vehicle 10 may be detected.

At steps 108 and 110, a comparison of the height h of the approaching obstacle 20 determined in step 106, with the height of the vehicle 10 determined in step 116 is made. For instance, in step 108, the total height of the vehicle 10 may be adjusted to include an anticipated, possible total height in the vehicle 10 as noted above, assuming that this has not yet already been factored into the total height reported by the first sensor 6. Step 108 may also involve determining a safe height threshold compared to the height h of the approaching obstacle reported by the second sensor 4. By way of example, the safe height threshold may be computed as a percentage of the height h, or (e.g. the safe height threshold may be 80%, 85%, 90%, or 95% etc. of the approaching obstacle height), or may be associated with an absolute difference between the height of the vehicle 10 and the height of the approaching obstacle (e.g. the threshold may be 100 cm, 50 cm, 30 cm etc. less than the approaching obstacle height). It is envisaged that the safe height threshold could be programmable, e.g. according to the type of vehicle. The comparison of the height of the vehicle 10 with the height of the approaching obstacle 20 may be performed in step 110. For instance, the total height z of the vehicle 10, possibly including any possible, anticipated changes in the total height as described above, may be compared with the safe height threshold described above. The result of this comparison may be reported to step 130, to be described below.

A third branch of the method 100 starts at step 122. The third branch corresponds to the operation of the controller 2 and any vehicle electronic components 50 of the kind described above in relation to FIG. 2.

In this embodiment, at step 124 a determination is made by the controller 2 as to whether the sunroof or window on the vehicle 10 is open. While FIG. 5 is explained here in relation to a sunroof or window of the vehicle, it will be appreciated that the method of FIG. may also be applied to a window of the vehicle 10. If the sunroof or window is determined to be open, then the method 100 may pass to step 126. Step 126 may involve the performance of a collision prevention action such as the application of the brakes of the vehicle 10 and/or the production of a warning alert to the driver of the vehicle 10, in response to a determination in step 110 that a collision is possible. For a further description of the actions which may be taken if it is determined in step 124 that the sunroof or window is already open, see FIG. 6.

On the other hand, in this embodiment, one of the possible collision prevention actions that may be performed is the prevention of the opening of the sunroof or window if it is determined in step 110 that, for example, a passenger putting their head through the sunroof or window of the vehicle may cause the total height of the vehicle 10 to meet or exceed the safe height threshold. Accordingly, if the sunroof or window is determined in step 124 to be currently closed, the method 100 may pass to step 128.

In step 128, a determination is made by the controller 2 as to whether there has been a user (driver, passenger . . . ) request to open the sunroof or window. This user request may correspond to a request 48 of the kind described above in relation to FIG. 2.

If, in step 128, it is determined that no such user request has been received, then the method 100 may loop back to step 128. In this way, the controller may periodically monitor for any user requests 48 to open the sunroof or window. On the other hand, if it is determined in step 128 that there is a user request to open the sunroof or window, the method 100 may pass to step 130.

The parts of the method 100 shown in box 160 in FIG. 5 correspond to the processing of a user request to open the sunroof or window, and the performance of a collision prevention action involving denying the user request to open the sunroof or window, if this may cause a collision (e.g. were a passenger to put their head through the open sunroof or window).

In step 130, the outcome of the determination made in step 110 is received in conjunction with the indication from step 128 that there has been a request to open the sunroof or window.

In step 140, a determination is made as to whether it is safe to allow the sunroof or window to be opened. In particular, if the determination in step 110 indicated that a collision is possible (e.g. that the anticipated change x in height z associated with a passenger possibly putting their head through the open sunroof or window may lead to a collision), then the method 100 may pass to step 154.

In step 154, a collision prevention action may be taken. In this embodiment, the collision prevention action may involve denying the user request 48 to open the sunroof or window of the vehicle 10. This may, for instance, be implemented by disabling the in-vehicle controls which operate the sunroof or window. It is also envisaged that the collision prevention action may involve applying the brakes of the vehicle 10 and/or generating an collision alert for a driver of the vehicle 10. The alert may, for instance, be an audible and/or visual alert.

The method 100 may be at step 156.

On the other hand, if at step 140 it is determined that it is safe to open the sunroof or window (e.g. the height h of any approaching obstacles is high enough that no collision would occur if a passenger were to put their head through the open sunroof or window, or if no approaching obstacles have been detected), then the method 100 may pass to step 150.

At step 150, it is determined that no collision prevention action is required and, consequently, at step 152, the controller 2 allows the sunroof or window to be opened. This may, for instance, be implemented by the controller signaling a sunroof or window control unit 50A of the kind shown in FIG. 2 to open the sunroof or window.

Following step 152, the method 100 may loop back to step 124.

Figure 6:
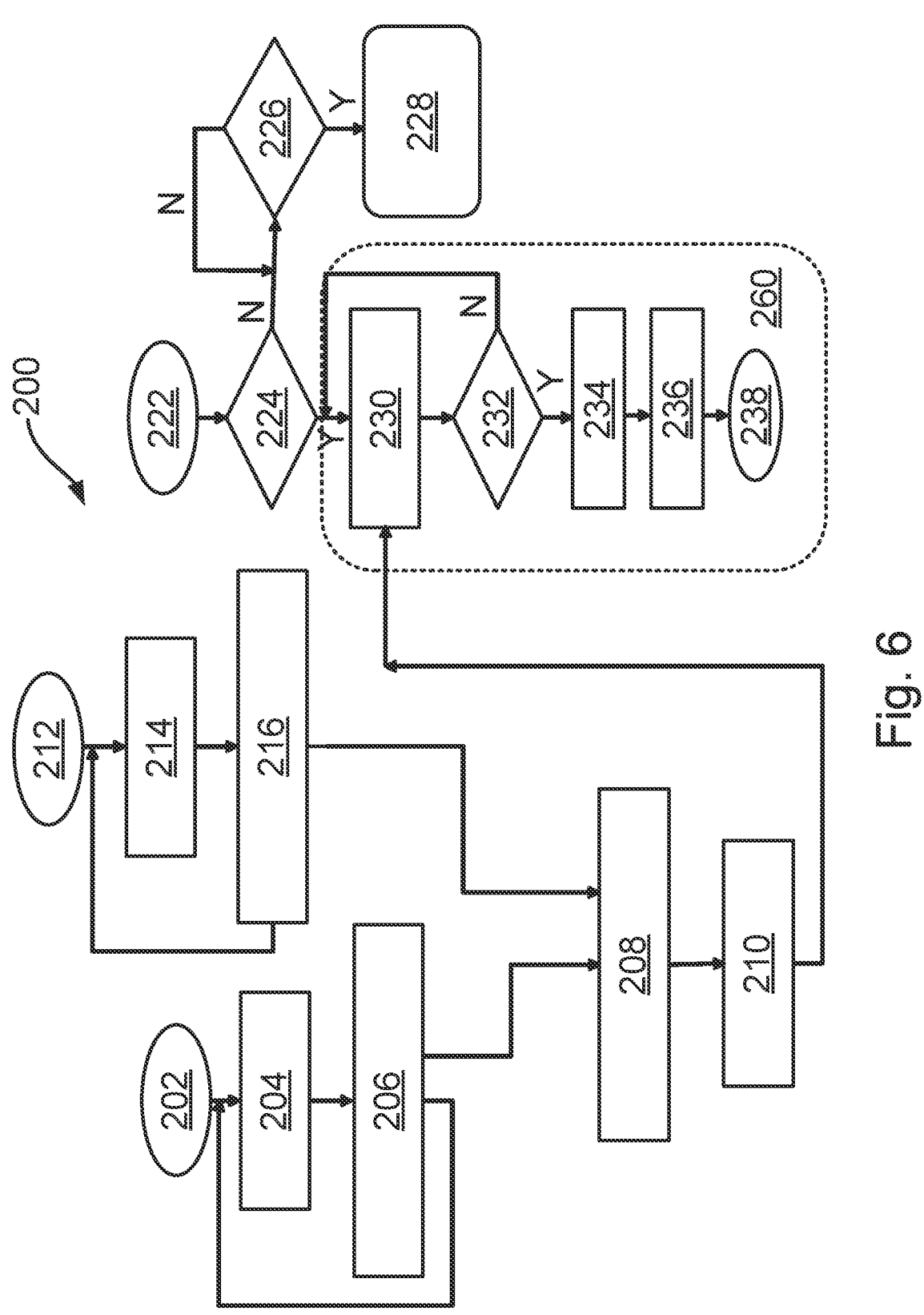
FIG. 6 shows a method according to another embodiment of this disclosure.

FIG. 6 shows a collision prevention method 200 according to another embodiment of this disclosure. The method 200 in this embodiment includes a number of different branches, starting at steps 202, 212, 222. Note that these branches may be performed in parallel.

Note the FIG. 6 is similar to FIG. 5, except that FIG. 6 shows in more detail the actions which may be taken if it is determined in step 124 that the sunroof or window is already open. Accordingly, the following steps in FIG. 6 correspond to the following steps in FIG. and the description of these steps will not be repeated here:

the steps 202, 204, 206 of the first branch of the method 200 in FIG. 6 correspond to the steps 102, 104, 106 of the first branch of the method 100 in FIG. 5, respectively;

the steps 212, 214, 216 of the second branch of the method 200 in FIG. 6 correspond to the steps 112, 114, 116 of the second branch of the method 100 in FIG. 5, respectively;

steps 208 and 210 of the method 200 in FIG. 6 correspond to steps 108 and 110 of the method 100 in FIG. 5, respectively; and steps 222, 224 and 226 of the method 200 in FIG. 6 correspond to steps 122, 124 and 128 of the method 100 in FIG. 5, respectively.

As described previously, step 226 in FIG. 6 (which corresponds to step 128 in FIG. 5) is reached if, in step 224, it is determined that the sunroof or window is currently closed. Note that in step 226 of FIG. 6, if it determined that there has been a user request to open the sunroof or window, then the method 200 may proceed to box 228 which includes steps as described above in relation to the steps in box 160 in FIG. 5.

On the other hand, if it is determined in step 224 that the sunroof or window is currently open, then the method 200 may pass to step 230.

The parts of the method 200 shown in box 260 in FIG. 6 correspond to the performance of a collision prevention action involving applying a brake of the vehicle and/or producing a collision alert for a driver of the vehicle.

In step 230, the outcome of the determination made in step 210 is received in conjunction with the indication from step 224 that the sunroof or window is currently open. Unlike in the embodiment of FIG. 5, since the sunroof or window is already open, the option to prevent opening of the sunroof or window does not exist. In this embodiment nevertheless, the controller 2 has the option to perform a collision prevention action involving applying a brake of the vehicle 10 and/or producing a collision alert for a driver of the vehicle 10.

In step 232, a determination is made as to whether a collision may occur. This determination may be based on the determination in step 210, which indicated that a collision is possible (e.g. that the anticipated change x in height z associated with a passenger possibly putting their head through the open sunroof or window may lead to a collision).

If, in step 232, it is determined that no collision is possible (e.g. because there are no approaching obstacles or because the height h of the obstacle is such that the safe height threshold is not met or exceeded), the method 200 may loop back to step 230. In this way, the method 200 may continue to monitor for possible collisions.

On the other hand if, in step 232, it is determined that a collision is possible, the method 200 may pass to step 234. In step 234, the controller 2 may determine that a collision prevention action is required.

In step 236, the controller 2 may implement the collision prevention action. As described above, the collision prevention action may involve applying the brakes of the vehicle. To implement this, the controller 2 may, for instance, send a command signal to a brake control unit 50B of the vehicle 10 (as described in FIG. 2) to apply the brakes of the vehicle 10. As an alternative, or in addition to the application of the brakes, the controller 2 may also implement the collision prevention action involving producing a collision alert for a driver of the vehicle 10. The alert may, for instance, be an audible alert (such as an alarm sounds or pre-recorded verbal warning) and/or visual alert (such as a warning light or symbol appearing on the dashboard of the vehicle).

The method 200 may end at step 238.

Figure 7:
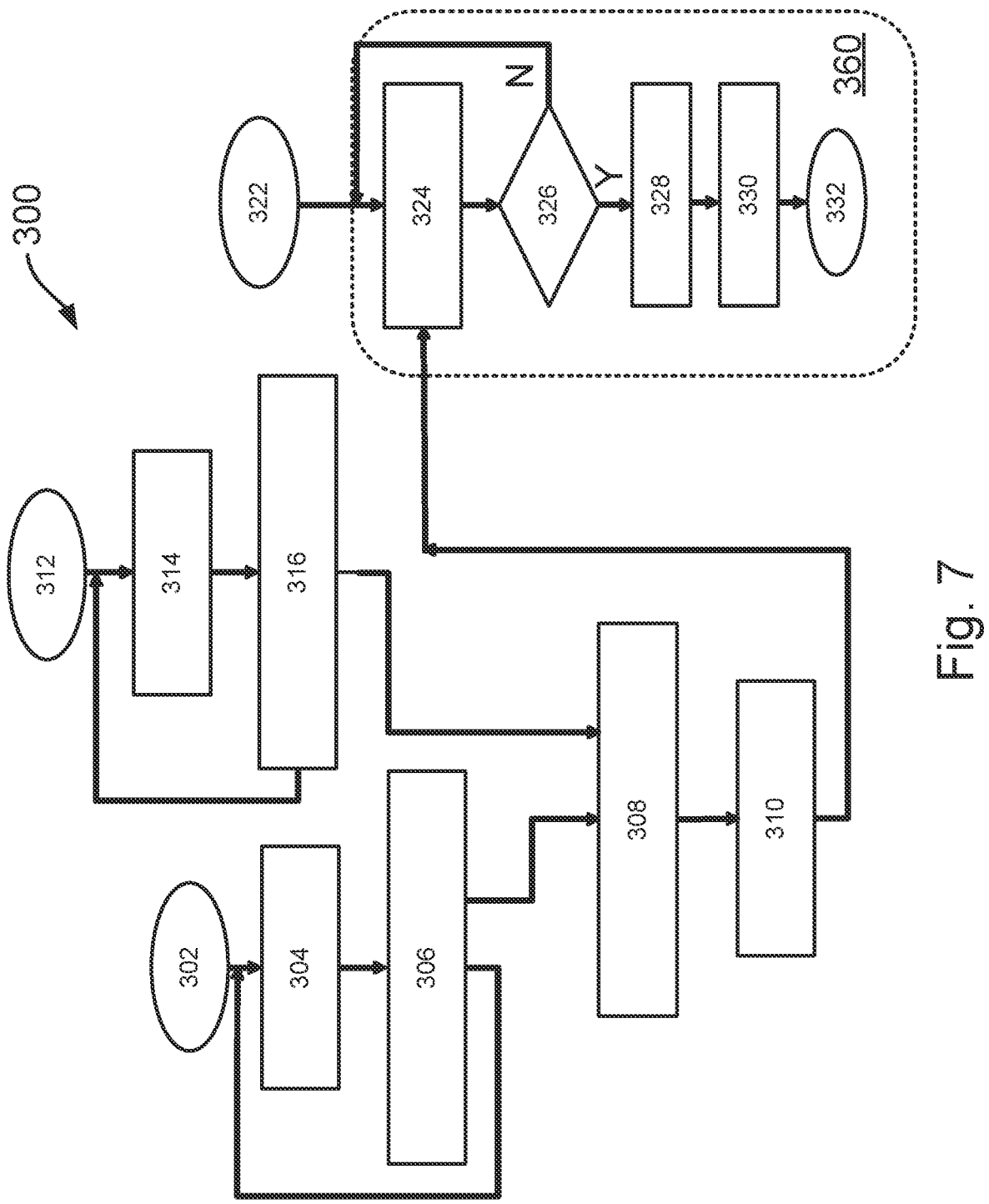
FIG. 7 shows a method according to a further embodiment of this disclosure.

FIG. 7 shows a collision prevention method 300 according to a further embodiment of this disclosure. The method 300 in this embodiment includes a number of different branches, starting at steps 302, 312, 322. Note that these branches may be performed in parallel.

Note the FIG. 7 is similar to FIGS. 5 and 6, except that FIG. 7 involves the application of the brakes of the vehicle and/or the production of a collision alert for a driver of the vehicle, without necessarily involving the operation of the sunroof or window of the vehicle. Accordingly, the following steps in FIG. 7 correspond to the following steps in FIG. 5 and the description of these steps will not be repeated here:

the steps 302, 304, 306 of the first branch of the method 300 in FIG. 7 correspond to the steps 102, 104, 106 of the first branch of the method 100 in FIG. 5, respectively;

the steps 312, 314, 316 of the second branch of the method 300 in FIG. 7 correspond to the steps 112, 114, 116 of the second branch of the method 100 in FIG. 5, respectively; and steps 308 and 310 of the method 300 in FIG. 7 correspond to steps 108 and 110 of the method 100 in FIG. 5, respectively.

A third branch of the method 300 in FIG. 7 may start at step 322.

As in FIG. 6, the parts of the method 300 shown in box 360 in FIG. 7 correspond to the performance of a collision prevention action involving applying a brake of the vehicle and/or producing a collision alert for a driver of the vehicle. However, the present embodiment is generic in the sense that the collision prevention action may include any of the application of the brakes of the vehicle 10, the production of collision alert for a driver of the vehicle 10, and/or the denial of a user request 48 (such as a request to open a sunroof or window of the vehicle 10.

In step 324, the outcome of the determination made in step 310 is received by the controller 2. As describe previously, step 324 may, in some embodiments, involve determining whether a sunroof or window of the vehicle is open and then tailoring the collision prevention action accordingly. However, for the remainder of the description of this embodiment, it will be assumed that the operation of the sunroof or windows is not factored into the determination and performance of a collision prevention action. In that sense, the embodiment of FIG. 7 may be applied to embodiments of the kind described above in relation to FIG. 4, in which the height of the vehicle is associated with a load 34 placed on the vehicle. Nevertheless, the method 300 may still factor in anticipated possible changes in the height of the load, as noted previously.

In step 326, the controller may determine whether a collision is possible, based upon the indication from step 310 received by the controller in step 324. If, in step 326, it is determined that a collision is not possible (e.g. because there are no approaching obstacles or because the height h of the obstacle is such that the safe height threshold is not met or exceeded), then the method 300 may loop back to 324. In this way, the method 300 may continue to monitor for possible collisions.

On the other hand if, at step 326 it is determined that a collision is possible, the method 300 may pass to step 328. In step 328, the controller 2 may determine that a collision prevention action is required.

In step 330, the controller 2 may implement the collision prevention action. As described above, the collision prevention action may involve applying the brakes of the vehicle. To implement this, the controller 2 may, for instance, send a command signal to a brake control unit 50B of the vehicle 10 (as described in FIG. 2) to apply the brakes of the vehicle 10. As an alternative, or in addition to the application of the brakes, the controller 2 may also implement the collision prevention action involving producing a collision alert for a driver of the vehicle 10. The alert may, for instance, be an audible alert (such as an alarm sounds or pre-recorded verbal warning) and/or visual alert (such as a warning light or symbol appearing on the dashboard of the vehicle).

The method 300 may end at step 332.

Although FIGS. 5 to 7 have been explained in relation to height, it will be appreciated that the same principles may be applied to other dimensions such as a lateral dimension of the vehicle and a lateral dimension of the approaching obstacle.

According to an embodiment, there may be provided a vehicle including a collision prevention system of the kind described above.

Accordingly, there has been described a collision prevention system for a vehicle. A collision prevention method for a vehicle. The system includes a first sensor operable to monitor a dimension (e.g. height) of the vehicle. The system also includes a second sensor for detecting a dimension (e.g. height) of an approaching obstacle. The system further includes a controller couplable to the first sensor and the second sensor. The controller is operable to compare the dimension of the vehicle monitored by the first sensor with the dimension of the approaching obstacle detected by the second sensor. The controller is also operable to, in response to a determination that the comparison of the dimension of the vehicle with the dimension of the approaching obstacle indicates a collision between the vehicle and the obstacle is possible, perform a collision prevention action.

Although particular embodiments of this disclosure have been described, it will be appreciated that many modifications/additions and/or substitutions may be made within the scope of the claims.

The invention claimed is:

1. A collision prevention system for a vehicle, the system comprising:
   a first sensor operable to monitor a dimension of the vehicle by periodically sensing the dimension of the vehicle;
   a second sensor for detecting a dimension of an approaching obstacle; and
   a controller couplable to the first sensor and the second sensor,
   wherein the controller is operable to:
      perform a comparison of the dimension of the vehicle monitored by the first sensor with the dimension of the approaching obstacle detected by the second sensor; and
      in response to the comparison of the dimension of the vehicle with the dimension of the approaching obstacle indicating a collision between the vehicle and the obstacle is possible and based on a window or a sunroof of the vehicle being closed, perform a collision prevention action comprising disabling an opening mechanism of the window or the sunroof, wherein the first sensor and the second sensor each comprise one of a camera, an ultrasound sensor, a RADAR sensor, or a LIDAR sensor.

2. The collision prevention system of claim 1, wherein the comparison comprises determining whether the dimension of the vehicle monitored by the first sensor exceeds a safe dimension threshold compared to the dimension of the approaching obstacle.

3. The collision prevention system of claim 1, wherein the dimension of the vehicle is a total dimension including a dimension of a load mounted on the vehicle and/or of a passenger protruding from the vehicle.

4. The collision prevention system of claim 1, the controller operable to:
   in response to the comparison of the dimension of the vehicle with the dimension of the approaching obstacle indicating the collision between the vehicle and the obstacle is possible and based on the window or the sunroof of the vehicle being open, perform an alternative collision prevention action wherein comprising applying a brake of the vehicle or generating a collision alert for a driver of the vehicle.

5. The collision prevention system of claim 1, wherein the dimension of the vehicle monitored by the first sensor comprises a height of the vehicle, and wherein the dimension of the approaching obstacle detected by the second sensor comprises a height of the approaching obstacle.

6. The collision prevention system of claim 1, wherein the collision prevention action comprises applying a brake of the vehicle or generating a collision alert for a driver of the vehicle.

7. The collision prevention system of claim 1, wherein the collision prevention action comprises determining whether a request to open the window or the sunroof has been received while the window or the sunroof is closed.

8. A vehicle comprising the collision prevention system of claim 1.

9. A collision prevention method for a vehicle, the method comprising:
   monitoring, with a first sensor, a dimension of the vehicle by periodically sensing the dimension of the vehicle;
   detecting, with a second sensor, a dimension of an approaching obstacle;
   performing a comparison of the dimension of the vehicle with the dimension of the approaching obstacle; and
   in response to the comparison of the dimension of the vehicle with the dimension of the approaching obstacle indicating a collision between the vehicle and the obstacle is possible and based on a window or a sunroof of the vehicle being closed, performing a collision prevention action comprising disabling an opening mechanism of the window or the sunroof,
   wherein the first sensor and the second sensor each comprise one of a camera, an ultrasound sensor, a RADAR sensor, or a LIDAR sensor.

10. The method of claim 9, wherein the dimension of the vehicle is a total dimension including a dimension of a load mounted on the vehicle or of a passenger protruding from the vehicle.

11. The method of claim 9, further comprising:
   in response to the comparison of the dimension of the vehicle with the dimension of the approaching obstacle indicating the collision between the vehicle and the obstacle is possible and based on the window or the sunroof of the vehicle being open, performing an alternative collision prevention action comprising applying a brake of the vehicle or generating a collision alert for a driver of the vehicle.

12. The method of claim 11, wherein the collision prevention action comprises determining whether a request to open the window or sunroof has been received while the window or the sunroof is closed.

13. The method of claim 9, wherein the monitored dimension of the vehicle comprises a height of the vehicle, and wherein the detected dimension of the approaching obstacle comprises a height of the approaching obstacle.

14. The method of claim 9, wherein the collision prevention action comprises applying a brake of the vehicle or generating a collision alert for a driver of the vehicle.

15. The method of claim 9, wherein the comparison comprises determining whether the dimension of the vehicle exceeds a safe dimension threshold compared to the dimension of the approaching obstacle.

16. A vehicle comprising a collision prevention system, the collision prevention system comprising:

a first sensor operable to monitor a dimension of the vehicle by periodically sensing the dimension of the vehicle;

a second sensor for detecting a dimension of an approaching obstacle; and a controller couplable to the first sensor and the second sensor, wherein the controller is operable to:

perform a comparison of the dimension of the vehicle monitored by the first sensor with the dimension of the approaching obstacle detected by the second sensor; and in response to the comparison of the dimension of the vehicle with the dimension of the approaching obstacle indicating a collision between the vehicle and the obstacle is possible and based on a window or a sunroof of the vehicle being closed, performing a collision prevention action comprising disabling an opening mechanism of the window or the sunroof, wherein the first sensor and the second sensor each comprise one of a camera, an ultrasound sensor, a RADAR sensor, or a LIDAR sensor.

17. The vehicle of claim 16, wherein the dimension of the vehicle monitored by the first sensor comprises a height of the vehicle, and wherein the dimension of the approaching obstacle detected by the second sensor comprises a height of the approaching obstacle.

* * * * *